Dec. 27, 1955     L. PREISLER ET AL     2,728,580
COLLAPSIBLE BABY STROLLER
Filed Feb. 9, 1953     2 Sheets-Sheet 1
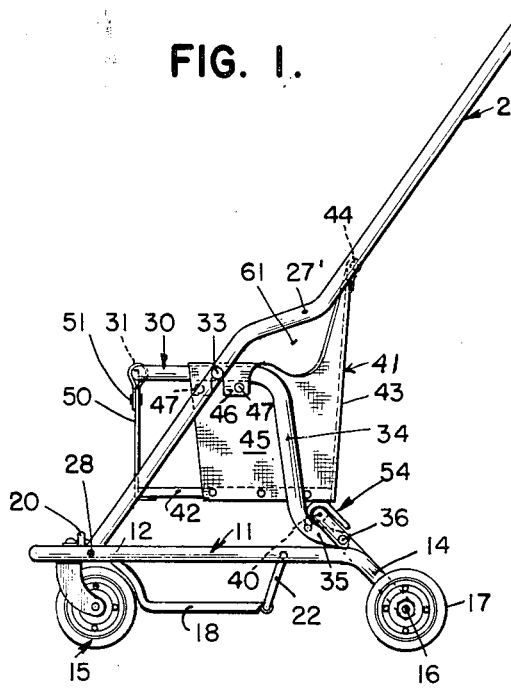
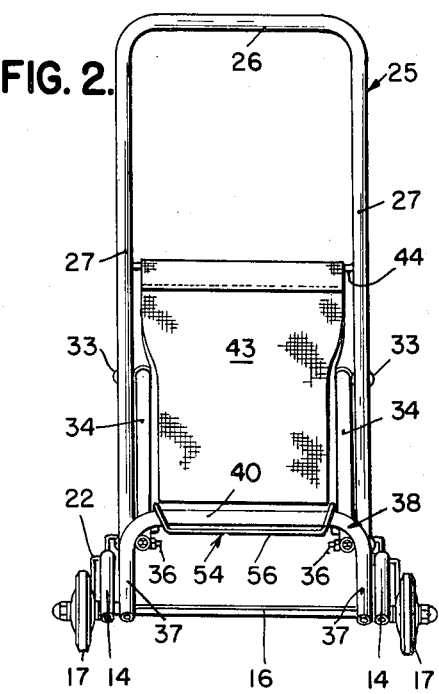
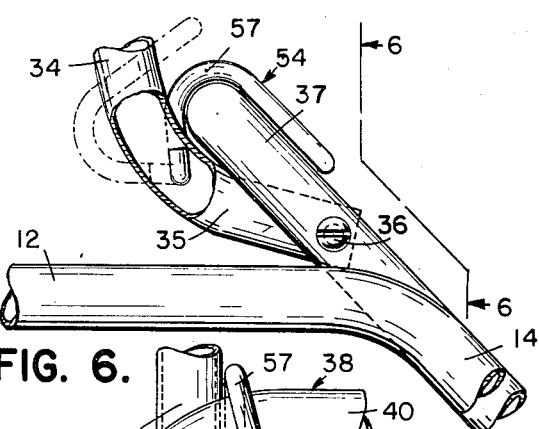
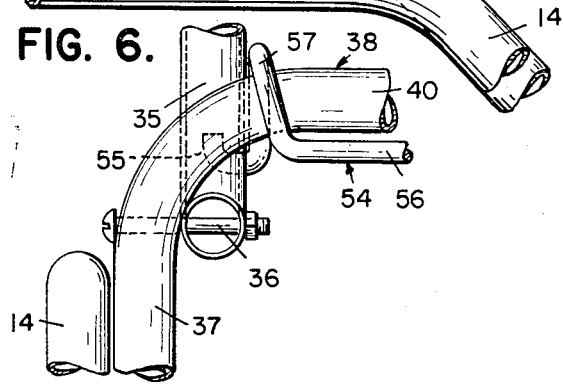
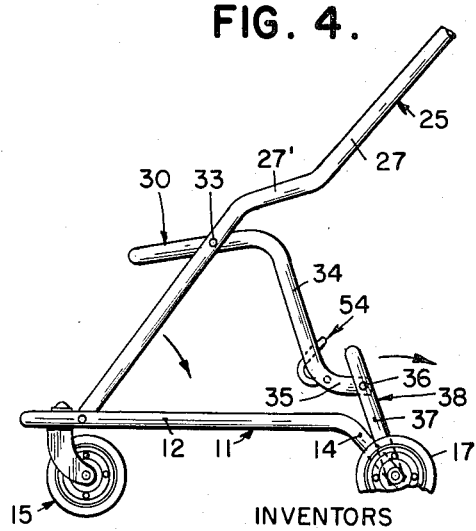
INVENTORS
LEON PREISLER
SAMUEL M. SHONE
BY
*Mason & Graham*
ATTORNEYS Dec. 27, 1955 L. PREISLER ET AL 2,728,580
COLLAPSIBLE BABY STROLLER
Filed Feb. 9, 1953 2 Sheets-Sheet 2

INVENTORS
LEON PREISLER
SAMUEL M. SHONE
BY
Mason & Graham
ATTORNEYS

United States Patent Office 2,728,580
Patented Dec. 27, 1955

2,728,580

COLLAPSIBLE BABY STROLLER

Leon Preisler and Samuel M. Shone, Los Angeles, Calif., assignors to Strolee of California, Inc., Los Angeles, Calif., a corporation of California Application February 9, 1953, Serial No. 335,732

16 Claims. (Cl. 280—36)

This invention has to do with baby strollers or hand-propelled vehicles for wheeling babies about in a sitting position.

An object of our invention is to provide a collapsible baby stroller of novel, simplified, and improved construction which is easy to handle and can readily be collapsed or expanded with a minimum of effort and handling.

A further object of the invention is to provide a construction for a collapsible baby stroller embodying novel means for positively releasably locking the apparatus in normal or expanded position and means for yieldably locking the apparatus in collapsed position.

Another object is to provide a baby stroller which is designed to stay in normal or expanded position under the influence of the weight of an occupant in the event the latch means is not engaged. A further object is to provide a baby stroller having the safety feature that the seat portion thereof is so positioned that when occupied it interferes with and prevents collapse of the frame structure of the device.

A disadvantage of many strollers is the fact that they are so constructed that a large-enough space exists between the seat and the inclined bars of the handle frame to permit the child's head to extend through with the consequent danger of its getting caught or being struck by an object outside the stroller. A further object of our invention is to provide a frame construction which protects the child by overcoming this disadvantage.

Still another object is to provide a baby stroller which can be readily fabricated and which is easy to assemble.

These and other objects will be apparent from the drawings and the following description.

Referring to the drawings:

Fig. 1 is a side elevational view of a baby stroller vehicle embodying the invention;

Fig. 2 is a rear elevational view of the device of Fig. 1;

Fig. 4 is a side elevational view of the frame structure shown intermediate the fully open and collapsed positions;

Fig. 5 is an enlarged fragmentary elevational view of a portion of the frame and toggle bar and latch;

Fig. 6 is an enlarged fragmentary view on line 6—6 of Fig. 5;

Figure 3:
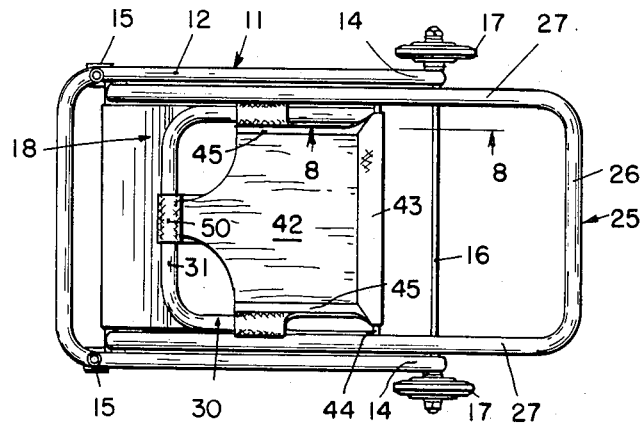
Fig. 3 is a plan view of the device.

More particularly describing the invention, the device includes a base frame 11, which comprises a U-shaped tubular member 12 having downwardly and rearwardly inclined ends 14. Caster-type wheels 15 are provided at the front of the frame and the end portions 14 are apertured to receive a shaft 16 on which wheels 17 are mounted.

The base frame supports a foot rest, comprising a floor member 18 which may be made of sheet metal or the like attached at its forward end to a cross bar 20 supported between the side portions of the base frame. The rearward end of the foot rest is supported upon a U-shaped rod 22, the ends of which are anchored in the side portions of the frame 12.

We provide a handle frame 25 which is also U-shaped and may be made of tubular stock. This includes a handle cross bar portion 26 and side bars 27, the lower ends of which are pivotally secured at 28 to the sides, respectively, of the base frame. An arm rest frame 30, consisting preferably of a tubular member, has a coplanar, U-shaped forward portion 31 which is pivotally secured to the sides 27 of the handle frame at 33. Rearwardly of this, the frame 30 has depending portions 34 which terminate in rearwardly inclined end portions 35. The latter are pivotally connected at 36 to the legs 37 of a toggle bar 38. The latter is of inverted U shape, having a main section 40 connecting the legs which are pivotally mounted on the axle 16.

A seat or occupant support 41 is suspended from the handle frame and the arm rest frame. The seat includes a fabric member having a back portion 43 suspended from a cross bar 44 extending between sides 27 of frame 25 and having side portions 45 which include bifurcated arm rest sections 46 which extend over frame 30 and are secured by snaps 47 to the main part of the side portions 45. The fabric member is fastened to a seat plate 42 which may be of any suitable material. The forward part of the seat plate is supported by a strap 50 extending around the front portion 31 of the frame 30, the strap having one or more snap fasteners 51. Cross bar 44 has its ends removably mounted in holes (not shown) in sides 27 of frame 25. With the construction described the seat may be readily installed in the frame and may be easily removed for cleaning when desired.

We provide a latch bar 54 the ends 55 of which are pivotally anchored in the end portions 35 of frame 30. The bar includes a central portion 56 and J bend portions 57 connecting the ends with the central portion. In latched position, the latch bar extends over and holds the toggle member 38 against movement.

It will be apparent from the above and the drawings that the toggle member 38 and the arm rest frame 30 form a toggle linkage connection between the handle frame 25 and the base frame 11. When the frame parts are in normal or open position, the axis of the pivotal connections 36 between frames 30 and 38 is laterally downwardly offset from or downwardly over center of a line passing through the axis of pivotal connection of the member 38 with the base frame and the axis of pivotal connection between the frames 25 and 30. Also, with the parts in this position, the upper part of bar 38 bears against the end portions of the frame limiting movement of the parts. In consequence, weight on the seat tends to more firmly hold the toggle linkage in the position in which it is shown in Fig. 1. The latch bar 54, when hooked over the toggle bar, as shown in Figs. 1, 5, and 6, insures retention of the parts in the normal or expanded position.

One of the safety features of the invention is the fact that the seat 42 extends rearwardly, so that it overlies the upper portion 40 of the toggle bar 38 as shown in Fig. 1. Thus when the seat is occupied the toggle bar cannot be raised or pivoted rearwardly as indicated in Fig. 4, since it will abut the bottom of the seat.

Another safety feature of the device is the provision of an offset portion 27' in each side bar 27 of the handle frame. This reduces to a minimum the size of the opening 61 defined by the upper edge of the seat and the side bar of the handle frame thereby preventing the possibility of the child's head extending through this opening.

Figure 7:
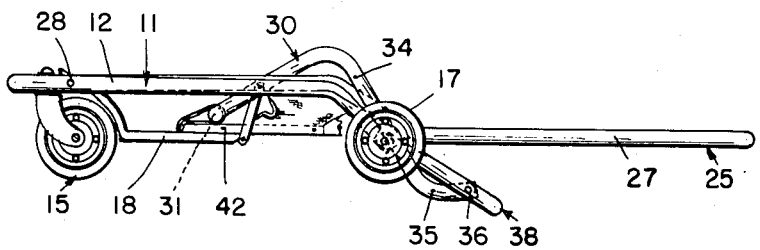
Fig. 7 is a side elevational view of the apparatus in collapsed position.
Figure 8:
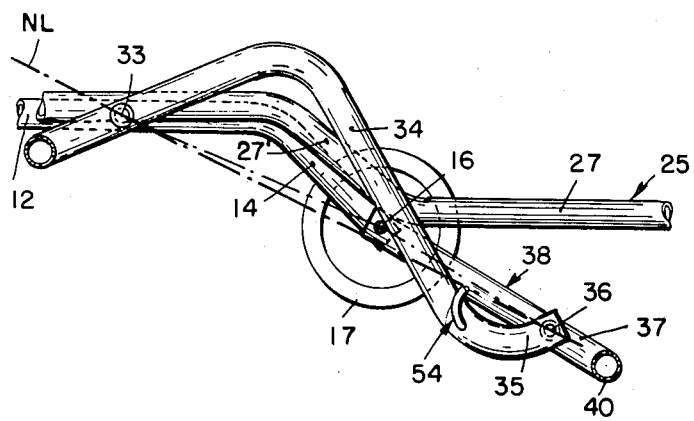
Fig. 8 is an enlarged fragmentary sectional view in the plane of line 8—8 of Fig. 3 but showing the parts in the collapsed position of Fig. 7.

As previously indicated, the device is designed to fold or collapse to occupy a minimum of space and in Figs. 7 and 8 the parts are shown in collapsed position. In order to collapse the structure the latch bar 54 is first pivoted forwardly to disengage the toggle bar 38 after which the toggle bar may be pivoted rearwardly so that the parts move in the direction of the arrows as illustrated in Fig. 4.

As the parts move to collapsed position, the toggle bar 38 and the ends 35 of frame 30 swing about the axle 16 and the seat portion 42 is gripped between the forward part 31 of frame 30 and the foot support part 18. The foot rest is so located that it forms a stop for the forward part 31 of frame 30 (with the seat member 42 between) thereby limiting downward movement of the forward part 31 of the frame 30. In consequence, in completing the collapse of the frame it is necessary to slightly spring the frame 30 to achieve the final, releasably locked, collapsed position of Figs. 7 and 8. This is accomplished by exerting force on the parts in a direction to move axle 16 upwardly and rearwardly so that it passes over-center or laterally beyond a neutral line NL passing through the pivotal axes 33 and 36. The pressure of frame 30 against the seat part 42 and foot rest 18 yieldably holds the parts in fully collapsed position. Upward pressure on the toggle bar releases the parts so they can be readily returned to normal, expanded position. This can easily be accomplished with the device in prone position by slight downward pressure on the handle, since the toggle bar, in collapsed position of the device, is below the rear wheels and rests upon the floor.

Although we have illustrated and described a preferred form of our invention, we contemplate that various changes and modifications can be made without departing from the invention, the scope of which is indicated by the following claims.

We claim:

1. In a baby stroller vehicle or the like, a base frame terminating in a pair of corresponding, laterally spaced, rearwardly projecting portions, ground-engaging wheels on said base frame, a handle frame having a pair of laterally spaced, inclined side bars pivotally mounted at the sides adjacent the forward end of said base frame, an arm rest frame having an upper U-shaped portion pivotally connected at its sides to the side bars of said handle frame and having laterally spaced, corresponding depending portions terminating in rearwardly extending end portions, an inverted U-shaped toggle bar pivotally mounted at its lower ends on the projecting ends of said base frame, and a pivotal connection means between each end portion of said arm rest frame and a side of said toggle bar, said toggle bar being inclined forwardly to bear against the end portions of said arm rest frame limiting pivoting thereof.

2. A construction as set forth in claim 1 in which the common axis of the pivotal connections between the arm rest frame and the toggle bar is disposed forwardly and below a plane passing through the axes of pivotal connection between the arm frame and handle frame and between the base frame and the toggle bar when the frame parts are in normal position.

3. A construction as set forth in claim 1 in which said arm rest frame carries a latch member releasably engageable with said toggle bar for holding the same in position against said arm rest frame.

4. A construction as set forth in claim 1 in which said rearwardly projecting portions of said base are inclined downwardly and in which the pivotal connections between said toggle bar and the projecting end portions of said base are adjacent the ends of said projecting end portions of the base.

5. A construction as set forth in claim 1 in which the common axis of the pivotal connections between the arm frame and the toggle bar is disposed forwardly and below a plane passing through the axes of pivotal connection between the arm rest frame and handle frame and between the base frame and the toggle bar when the frame parts are in normal position and in which a seat is suspended from said handle and arm rest frames in a position overlying the upper end of said toggle bar and in the path of pivotal movement thereof.

6. In a device as described, a base frame, an inclined handle frame pivotally mounted upon and extending upwardly from the base frame, a toggle-like linkage connection between said base frame and said handle frame, said linkage connection including an arm rest member connected pivotally to said handle frame and extending forwardly of the pivotal connection therewith, a seat member suspended from said handle frame and said arm rest member, said seat member including a plate-like occupant-supporting member, said handle frame and said linkage connection being swingable to a collapsed position, and abutment means carried by said base frame below said occupant-supporting member of said seat in the path of and limiting movement of the forward part of said arm rest member as the same approaches collapsed position, said occupant-supporting member being sandwiched between said arm rest member and said abutment means in collapsed position of said device.

7. In a frame structure for a baby stroller vehicle or the like, a base frame, an inclined handle frame pivotally connected to and extending upwardly from the base frame, a toggle-like linkage connection between said base frame and said handle frame, and stop means limiting movement of said linkage connection over-center in a direction toward said base frame, said toggle-like linkage including an arm rest member pivotally connected to the handle frame and a toggle bar pivotally connected to the frame, said arm rest member including a portion projecting forwardly of the pivotal connection between said arm rest frame and said handle frame, said handle frame, said arm rest member and said toggle member being swingable to a collapsed position, and means carried by said base member limiting movement of the forwardly projecting portion of the arm rest member whereby the frame structure must be forced against the resistance of said arm rest member to a completely collapsed position such that the pivotal connection between said arm rest member and said toggle member is upwardly over-center of a line passing through the pivotal connection between said arm rest member and said handle member and between said toggle member and said base frame.

8. In a baby stroller vehicle or the like, a U-shaped base frame terminating at the rear in downwardly inclined ends, an axle mounted in said ends, ground-engaging rear wheels on said axle, ground-engaging front wheel means mounted on said base frame forwardly of said axle, a U-shaped handle frame having side bars pivotally mounted at the sides respectively of said base frame adjacent the front end thereof, said handle frame being inclined upwardly and rearwardly from the base frame, an arm rest frame having a pair of side bars pivotally connected intermediate their ends to the side bars respectively of the handle frame, said arm rest frame having a side bar connecting cross member disposed substantially forward of said handle frame, said side bars of said arm rest frame each including a normally substantially horizontal front portion, a depending intermediate portion and a rearwardly projecting end portion, and a toggle bar of inverted U shape pivotally connected intermediate its ends to said end portions of said arm rest frame, said toggle bar being pivotally mounted at its lower end on said axle, said toggle bar and arm rest frame forming a toggle-like linkage between said base frame and said handle frame, said toggle bar normally bearing against the ends of said arm rest frame with the toggle-like linkage in a below center relation.

9. A construction as set forth in claim 8 in which latch means is provided in one of said toggle bar and arm rest frame for releasably engaging the other thereof to hold said toggle-like linkage in normal position.

10. In a baby stroller vehicle or the like, a U-shaped base frame terminating at the rear in downwardly inclined ends, an axle mounted in said ends, ground-engaging rear wheels on said axle, ground-engaging front wheel means mounted on said base frame forwardly of said axle, a U-shaped handle frame having side bars pivotally mounted at the sides respectively of said base frame adjacent the front end thereof, said handle frame being inclined upwardly and rearwardly from the base frame, an arm rest frame having a pair of side bars pivotally connected intermediate their ends to the side bars respectively of the handle frame, said arm rest frame having a side bar connecting cross member disposed substantially forward of said handle frame, said side bars of said arm rest frame each including a normally horizontal front portion, a depending intermediate portion and a rearwardly projecting end portion, and a toggle bar of inverted U shape pivotally connected intermediate its ends to said end portions of said arm rest frame, said toggle bar being pivotally mounted at its lower end on said axle, said toggle bar and arm rest frame forming a toggle-like linkage between said base frame and said handle frame, said toggle bar normally bearing against the ends of said arm rest frame with the toggle-like linkage in a below-center relation, said handle frame, said toggle bar, and said arm rest frame being swingable to a collapsed position such that said toggle bar extends rearwardly of and below said axle to a point such that said axle is upwardly over-center with respect to the points of pivotal connection between the arm rest member and said toggle member and between the arm rest member and said handle frame, and means resisting movement of the parts to said last-mentioned over-center relation.

11. In a baby stroller vehicle or the like, a U-shaped base frame terminating at the rear in downwardly inclined ends, an axle mounted in said ends, ground-engaging rear wheels on said axle, ground-engaging front wheel means mounted on said base frame forwardly of said axle, a U-shaped handle frame having side bars pivotally mounted at the sides respectively of said base frame adjacent the front end thereof, said handle frame being inclined upwardly and rearwardly from the base frame, an arm rest frame having a pair of side bars pivotally connected intermediate their ends to the side bars respectively of the handle frame, said arm rest frame having a side bar connection cross member disposed substantially forward of said handle frame, said side bars of said arm rest frame each including a normally horizontal front portion, a depending intermediate portion and a rearwardly projecting end portion, and a toggle bar of inverted U shape pivotally connected intermediate its ends to said end portions of said arm rest frame, said toggle bar being pivotally mounted at its lower end on said axle, said toggle bar and arm rest frame forming a toggle-like linkage between said base frame and said handle frame, said toggle bar normally bearing against the ends of said arm rest frame with the toggle-like linkage in a below-center relation, said handle frame, said toggle bar, and said arm rest frame being swingable to a collapsed position such that said toggle bar extends rearwardly of and below said axle to a point such that said axle is upwardly over-center with respect to the points of pivotal connection between the arm rest member and said toggle member and between the arm rest member and said handle frame, a seat member suspended from said handle and arm rest frames, said seat member including a plate-like occupant-supporting member, a foot rest carried by said base frame, said foot rest being positioned below said seat occupant-supporting member and in the path of movement of the forward portion of said arm rest frame whereby said occupant-supporting member of said seat is sandwiched between and firmly gripped by said foot rest and said forward portion of said arm rest frame in the fully collapsed position of the frame parts.

12. In a frame structure for a baby stroller vehicle or the like, a base frame, an inclined handle frame pivotally mounted upon and extending upwardly from the base frame, an arm rest member pivotally connected to said handle frame, an inverted U-shaped toggle bar pivotally mounted at its lower ends to said base frame, a pivotal connection means between said toggle bar and said arm rest member which is limited in movement in one direction by engagement of said toggle bar and said arm rest member and latch means locking said pivotal connection in said above-mentioned position.

13. In a frame structure for a baby stroller vehicle or the like, a base frame, an inclined handle frame pivotally mounted upon and extending upwardly from the base frame, an arm rest member pivotally connected to said handle frame, an inverted U-shaped toggle bar pivotally mounted at its lower ends to said base frame, a pivotal connection means between each end portion of said arm rest frame and a side of said toggle bar which is limited in movement in one direction by engagement of said toggle bar with the ends of said arm rest frame, and latch means locking said pivotal connection in said above mentioned position.

14. In a frame structure for a baby stroller vehicle or the like, a base frame, an inclined handle frame pivotally mounted upon and extending upwardly from the base frame, an arm rest member pivotally connected to said handle frame, an inverted U-shaped toggle bar pivotally mounted at its lower ends to said base frame, a pivotal connection means between each end portion of said arm rest frame and a side of said toggle bar which is limited in movement in one direction by engagement of said toggle bar with the ends of said arm rest frame, said toggle bar being inclined forwardly to bear against the end portions of said arm rest, and latch means locking said pivotal connection in said above mentioned position.

15. In a frame structure for a baby stroller vehicle or the like, a base frame, an inclined handle frame pivotally mounted upon and extending upwardly from the base frame, an arm rest member pivotally connected to said handle frame, an inverted U-shaped toggle bar pivotally mounted at its lower ends to said base frame, a pivotal connection means between each end portion of said arm rest frame and a side of said toggle bar, said toggle bar being inclined forwardly to bear against the end portions of said arm rest, and a latch member pivotally connected to said arm rest member for releasably engaging said toggle arm and locking same in engagement with the end portions of said arm rest.

16. In a frame structure for a baby stroller vehicle or the like, a base frame, an inclined handle frame pivotally mounted upon and extending upwardly from the base frame, an arm rest member pivotally connected to said handle frame, an inverted U-shaped toggle bar pivotally mounted at its lower ends to said base frame, a pivotal connection means between each end portion of said arm rest frame and a side of said toggle bar, said toggle bar being inclined forwardly to bear against the end portions of said arm rest, and a latch member mounted upon said arm rest member for pivotal movement from a position out of engagement with said toggle arm to a position wherein said latch member engages said toggle arm and secures same in engagement with the end portions of said arm rest.

References Cited in the file of this patent

UNITED STATES PATENTS

| | | |
|---|---|---|
| 1,576,075 | Tisdell | Mar. 9, 1926 |
| 1,633,864 | Klingelsmith | June 28, 1927 |
| 2,241,799 | Welsh | May 13, 1941 |
| 2,469,475 | Reese | May 10, 1949 |
| 2,479,467 | Bryant | Aug. 16, 1949 |
| 2,616,719 | Heideman | Nov. 4, 1952 |
| 2,678,219 | Goodman | May 11, 1954 |